United States Patent
Sagawa et al.

[11] Patent Number: 6,142,176
[45] Date of Patent: Nov. 7, 2000

[54] RELIEF VALVE

[76] Inventors: Toyoaki Sagawa, 50-37, Karibadai 1-chome, Nishi-ku, Kobe-shi, Hyogo 651-2272; Masahiro Matsuo, 32, Kawasaki-cho 2-chome, Akashi-shi, Hgoyo 673-0014; Ryo Yamamoto, 2-17, Kasugadai 6-chome Nishu-ku, Kobe-shi, Hyogo 651-2276, all of Japan

[21] Appl. No.: 09/330,403

[22] Filed: Jun. 11, 1999

[30] Foreign Application Priority Data

Jun. 12, 1998 [JP] Japan .................................. 10-164813

[51] Int. Cl.$^7$ ................................. F16K 17/06
[52] U.S. Cl. ..................... 137/514.5; 137/514; 251/53
[58] Field of Search .............................. 251/53; 137/514, 137/514.5, 514.7

[56] References Cited

U.S. PATENT DOCUMENTS

| | | | |
|---|---|---|---|
| 4,051,864 | 10/1977 | Iwatsuki | 137/514.5 X |
| 5,638,860 | 6/1997 | DeRoche | 137/514.5 X |
| 5,669,356 | 9/1997 | Wall et al. | 137/514.3 X |
| 5,975,129 | 11/1999 | Williams | 137/514.5 X |

FOREIGN PATENT DOCUMENTS 723663  5/1995  Japan .

*Primary Examiner*—John Rivell
*Assistant Examiner*—Meredith H. Schoenfeld

[57] ABSTRACT

A relief valve, including a case having an inner bore, and an opening defining an outlet; a valve seat adjacent to a forward end of the case, the valve seat defining an inlet, a plunger slidably disposed within the case and pressed forward by a spring to shut off fluid communication between the inlet and the outlet, a piston slidably disposed within the case, and slidably receiving the plunger, the piston being configured for pushing forward a rear end of the spring, and which piston moves forward with the increase in the pressure at the inlet to compress the spring, thereby regulating a relief pressure, wherein the piston further comprises a first sliding portion configured for sliding with liquidtightness in the inner bore of case, and a sliding bore formed along a central axis of the piston, a rear portion of the plunger slidably inserted and fitted in the sliding bore formed along a central axis of the piston, and the plunger further comprising a through hole configured for feeding a pressurized liquid from the inlet to the rear of the plunger, and wherein the piston further comprises rearward acting face and a forward acting face, and the piston moves by a difference between the combined rearward acting forces given to a bottom face of the sliding bore and the rearward acting face by the pressurized liquid, and forward acting force given to the forward acting face by the pressurized liquid.

18 Claims, 7 Drawing Sheets

RELIEF VALVE

BACKGROUND OF THE INVENTION

1. Field of the Invention

The invention relates to a relief valve to be used for controlling a hydraulic pressure of a hydraulic circuit.

2. Description of the Related Art

For example, a hydraulic motor is generally used for a turning motor and a traveling motor for a construction machine vehicle, and is driven by a hydraulic circuit. A relief valve is used for controlling a hydraulic pressure of the hydraulic circuit.

FIG. 8 shows an example of a hydraulic circuit using a relief valve. As shown, a relief valve R10 communicates with a pressurized liquid supply port and a pressurized liquid exhaust port of a hydraulic motor M. An escape side of the relief valve R10 communicates with a liquid tank T through a boost check valve B for keeping a suction (negative) pressure of the motor. P denotes a hydraulic pump and V denotes a switching valve.

FIG. 10 is a sectional view showing a relief valve disclosed in Japanese Utility Model Publication No. Hei 7-23663. In the relief valve, a plunger 103 is pressed forward by means of a coiled spring 105. The plunger 103 moves rearward against elastic force of the coiled spring 105 to make an inlet 102a and an outlet 101a communicate with each other when a pressure of the inlet 102a is raised. A rear end of the coiled spring 105 is pushed forward by means of a piston 104 inserted and fitted in an inner bore of a case 101 for sliding. The piston 104 moves forward to compress the coiled spring 105 when the pressure of the inlet 102a is raised. Thus, a relief pressure is regulated. The plunger 103 can slide along a central axis of the piston 104.

In the relief valve having the above-mentioned structure, however, an annular sectional area having a diameter d104 as an outside diameter and a diameter d103 as an inside diameter is an effective pressure receiving area for actuating the piston 104. When the annular sectional area is excessively large, the piston 104 is actuated at a low pressure. Consequently, the actuation of the piston 104 is completed before the pressure of the inlet 102a reaches the relief pressure. As a result, a surge pressure is generated before the pressure of the inlet 102a reaches the relief pressure.

FIG. 11A shows a temporal change of a pressure in the inlet 102a. In the above-mentioned relief valve, there is a possibility that a surge pressure might be generated.

If a meter-out pressure of a control valve is high, the piston 104 performs full stroke at the same pressure. As a result, as shown in FIG. 11B, pressure rise control is not performed at all in some cases.

It is sufficient to prevent the surge pressure from being generated that the annular sectional area is reduced. In such a manner, however, the diameter d104 should be caused to approximate to the diameter d103. Consequently, thickness of an annular portion of the piston 104 is desired to be reduced, but thereby strength of the annular portion is made insufficient.

Even if a pressure rise control time is to be increased, there is a limit, because a volume absorbed by the piston 104 is small. Although the pressure rise control time can be increased by means of giving damping to the piston 104c, there is also a limit to what can be done.

SUMMARY OF THE INVENTION

In order to solve the above-mentioned problems, the invention provides a relief valve in which a plunger is pressed forward by a spring to shut off communication between an inlet and an outlet, and moves rearward against elastic force of the spring with an increase in a pressure of the inlet, thereby making the inlet and the outlet communicate with each other. A piston for pushing forward a rear end of the spring moves forward with the increase in the pressure of the inlet to compress the spring, thereby regulating a relief pressure. A liquid chamber accommodating the spring therein communicates with the outlet. The piston has a first sliding portion for sliding with liquidtightness in an inner bore of a case. A rear portion of the plunger is slidably inserted and fitted in a sliding bore formed along a central axis of the piston. The plunger has a through hole for feeding a pressurized liquid from the inlet to the back of the plunger. A third liquid chamber is realized by a space of a rear portion of the sliding bore that the plunger does not reach and the through hole. A rearward acting face and a forward acting face are provided rearward from the first sliding portion of the piston. The third liquid chamber and a first liquid chamber on which the rearward acting face fronts communicate with each other through a communicating hole formed in the piston. The third liquid chamber and a second liquid chamber on which the forward acting face fronts communicate with each other through a communicating hole formed in the piston. The piston moves forward by a difference between rearward acting force given to a bottom face of the sliding bore and the rearward acting face by the pressurized liquid, and forward acting force given to the forward acting face by the pressurized liquid.

The relief valve can be constructed in such a manner that an area of the forward acting face is greater than an total area of the bottom face of the sliding bore and the rearward acting face, and the difference between the rearward acting force and the forward acting force is generated by a difference between the area of the forward acting face and the total area.

Further, the relief valve can be constructed in such a manner that a second sliding portion having a diameter larger than a diameter of the first sliding portion, and a third sliding portion having a diameter smaller than the diameter of the first sliding portion, are provided to be positioned rearward from the first sliding portion on the piston respectively. The second sliding portion slides with liquidtightness in the inner bore of the case. The third sliding portion slides with liquidtightness in an inner bore formed on a cap fixed to the case. The rearward acting face is provided on a front end face of the second sliding portion, and the forward acting face is provided on a rear end face of the second sliding portion. Also, a liquid chamber on which a rear end face of the third sliding portion fronts communicates with the outlet.

Further, the relief valve can be constructed in such a manner that a second sliding portion having a diameter larger than a diameter of the first sliding portion, and a third sliding portion having a diameter smaller than the diameter of the first sliding portion, are provided to be positioned rearward from the first sliding portion on the piston. The second sliding portion slides with liquidtightness in the inner bore of the case. The third sliding portion slides with liquidtightness in an inner bore formed on a cap fixed to the case. The rearward acting face is provided on a front end face of the second sliding portion, and the forward acting face is provided on a rear end face of the third sliding portion, and a liquid chamber on which a rear end face of the second sliding portion fronts communicates with the outlet.

With such a structure, the difference between the area of the bottom face of the sliding bore and the rearward acting face, and that of the forward acting face, is set to the effective pressure receiving area of the piston. Consequently, the effective pressure receiving area is set irrespective of the thickness of the first sliding portion of the piston. Therefore, the effective pressure receiving area can be reduced without causing the insufficient strength of the piston. Accordingly, the piston can perform stroke movements until the pressure of the inlet reaches the relief pressure, thereby a surge pressure can be prevented from being generated.

Further, the relief valve can be constructed in such a manner that the third liquid chamber and the first liquid chamber communicate with each other through a communicating hole having a restriction, and the third liquid chamber and the second liquid chamber communicate with each other through a communicating hole having no restriction.

Further, the relief valve can be constructed in such a manner that the third liquid chamber and the second liquid chamber communicate with each other through a communicating hole having no restriction, while the first liquid chamber and the second liquid chamber communicate with each other through a communicating hole having a restriction; and the third liquid chamber and the first liquid chamber communicate with each other through the second liquid chamber.

Further, the relief valve can be constructed in such a manner that the third liquid chamber and the second liquid chamber communicate with each other through a communicating hole having a restriction, and the third liquid chamber and the first liquid chamber communicate with each other through a communicating hole having no restriction.

Further, the relief valve can be constructed in such a manner that the third liquid chamber and the first liquid chamber communicate with each other through a communicating hole having no restriction, while the first liquid chamber and the second liquid chamber communicate with each other through a communicating hole having a restriction, and the third liquid chamber and the second liquid chamber communicate with each other through the first liquid chamber.

Further, the relief valve can be constructed in such a manner that a pressure difference is generated across the restriction by a difference between the rearward acting force and the forward acting force; and, the piston moves forward while the pressurized liquid passes through the restriction.

With such a structure, the first liquid chamber has a pressure higher than the pressure of the second liquid chamber. If the effective pressure receiving area is reduced, the pressure difference across the restriction is reduced. Consequently, an exhaust flow velocity is reduced when the piston moves forward, and the piston moves forward more slowly. As a result, the pressure rise buffer time is increased. Alternatively, if the sectional area of the restriction opening is increased, the pressure rise buffer time is shortened. Thus, the pressure rise buffer time can be set freely by adjustment of the size of the restriction.

This object, as well as other objects, features and advantages of the invention will become more apparent to those skilled in the art from the following description taken with reference to the accompanying drawings.

DETAILED DESCRIPTION OF THE INVENTION

Embodiments of the invention will be described below with reference to the drawings.

Figure 1:
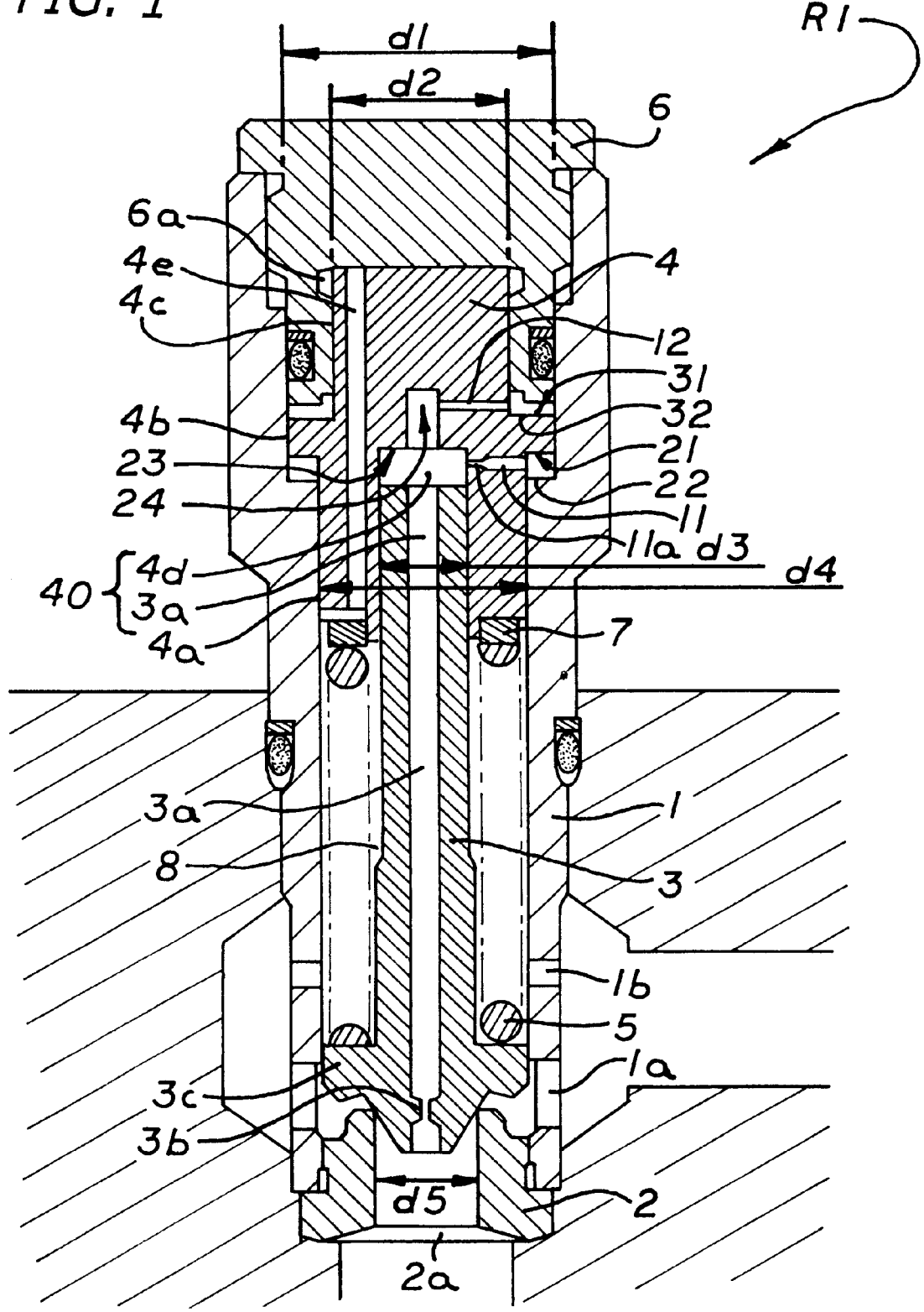
FIG. 1 is a longitudinal sectional view showing a relief valve according to an embodiment of the invention.

FIG. 1 is a longitudinal sectional view showing a relief valve R1 according to an embodiment of the invention. The relief valve R1 comprises an substantially cylindrical case 1, a valve seat 2 fixed to a tip of the case 1, a plunger 3 provided in the case 1, a piston 4 provided in the case 1, a coiled spring 5 disposed between the plunger 3 and the piston 4, and a cap 6 fixed to a rear end of the case 1.

An inner bore of the case 1 has a front portion formed with an inside diameter d4 and a rear portion formed with an inside diameter d1. The inside diameter d1 is greater than the inside diameter d4. An outlet 1a and a passage 1b are formed in and open on a side face of the case 1. The valve seat 2 is formed as an annular member, and a central portion thereof functions as an inlet 2a for a pressurized liquid. A tip of the plunger 3 has a tapered and truncated conical shape. A through hole 3a is formed in the center of the plunger 3. The through hole 3a penetrates from the tip of the plunger 3 to a rear end thereof, thereby feeding the pressurized liquid from the inlet 2a toward a rear portion of the plunger 3, and has a restriction 3b formed intermediate the ends thereof. The restriction 3b is provided for giving damping force to the actuation of the plunger 3 and for preventing hunting.

A first sliding portion 4a having an outside diameter d4 is formed in a front portion of the piston 4. A second sliding portion 4b having an outside diameter d1 which acts as a large diameter portion is formed on the piston 4 to be positioned behind the first sliding portion 4a. A third sliding portion 4c, which slides with liquidtightness in inner bore of the cap 6 fixedly coupled to the case 1, and has a diameter smaller than the diameter of the first sliding portion 4a, is formed on the piston 4 behind the second sliding portion 4b. The first sliding portion 4a is slidably inserted and fitted with liquidtightness in a portion having inside diameter d4 of the inner bore of the case 1. The second sliding portion 4b is slidably inserted and fitted with liquidtightness in an portion having inside diameter d1 of the inner bore of the case 1. The third sliding portion 4c has an outside diameter d2. The piston 4 has a sliding bore opened on a front face thereof along a central axis. The sliding bore has an inside diameter d3. The rear portion of the plunger 3 is slidably inserted and fitted in the sliding bore. A third liquid chamber 40 is realized by a rear space 4d of the sliding bore and a through hole 3a of the plunger 3. The rear space 4d of the sliding bore is formed in such a manner that the rear end of the plunger 3 does not reach thereto even if the plunger 3 slides to a rearmost portion of a slidable range. The state that the plunger 3 slides to a rearmost portion of a slidable range means a state that the coiled spring 5 is compressed completely. The piston 4 has a passage 4e formed therein. The passage 4e penetrates from a front end face of the first sliding portion 4a a rear end face of the third sliding portion 4c. A communicating hole 11 and a communicating hole 12 are formed in the piston 4. A restriction 11a is formed in a part of the communicating hole 11. A restriction is not formed in the communicating hole 12. A front end face of the large diameter portion (second sliding portion) 4b functions as a rearward acting face 21 on which a pressurized liquid acts. A first liquid chamber 22 on which the rearward acting face 21 fronts communicates with the third liquid chamber 40 through the communicating hole 11. A rear end face of the large diameter portion (second sliding portion) 4b functions as a forward acting face 31 on which the pressurized liquid acts. A second liquid chamber 32 on which the forward acting face 31 fronts communicates with the third liquid chamber 40 through the communicating hole 12.

The coiled spring 5 is accommodated in a spring chamber 8 (fifth liquid chamber) formed between an inner peripheral face of the case 1 and an outer peripheral face of the plunger 3. The coiled spring 5 is provided compressed in such a manner that a tip presses a bulky portion 3c of the plunger 3 forward from the back and a rear end presses the front end face of the first sliding portion 4a of the piston 4 rearward through a spring seat 7.

The cap 6 is screwed to close an opening on a rear side of the inner hole of the case 1. A bore 6a opened forward is formed on the cap 6 along a central axis. The bore 6a and the rear end portion of the piston 4 form a fourth liquid chamber. The bore 6a has an inside diameter d2, and the third sliding portion 4c of the piston 4 is inserted and fitted to be slidable in the bore 6a. The fourth liquid chamber communicates with the spring chamber 8 (fifth liquid chamber) through the passage 4e. Thereby, the fourth liquid chamber communicates with the outlet 1a through the spring chamber 8 (fifth liquid chamber) and passage 1b.

The relief valve R1 has a structure summarized above, and acts in the following manner with a rise in a hydraulic pressure at the inlet 2a. More specifically, before the hydraulic pressure of the inlet 2a is raised, the tip of the plunger 3 covers the inlet 2a, and thereby the inlet 2a is shut off from the outlet 1a. When the hydraulic pressure of the inlet 2a is starting to raise, the plunger 3 starts rearward movement by the hydraulic pressure against the elastic force of the coiled spring 5, thereby the inlet 2a and the outlet 1a communicate with each other.

On the other hand, the pressurized liquid in the inlet 2a is fed to the third liquid chamber 40 through the through hole 3a, and then acts on bottom faces 23 and 24 of the sliding bores. The pressurized liquid in the third liquid chamber 40 is fed to the first liquid chamber 22 and the second liquid chamber 32 through the communicating holes 11 and 12, and then acts on the rearward acting face 21 and the forward acting face 31. The area of the forward acting face 31 is greater than a total area comprised of an area of bottom faces 23, 24 combined with that of the rearward acting face 21. Therefore, by the operation of the pressurized liquid flowing into the third liquid chamber 40 through the communicating hole 11 and the restriction 11a, the piston 4 starts forward movement while pushing the rear end of the coiled spring 5 forward. The coiled spring 5 is compressed by the movement of both of the plunger 3 and the piston 4. Thereby, a rapid rise in a pressure of the inlet 2a is relieved and subjected to relief to the outlet 1a. Thus, a relief pressure is regulated.

The spring chamber 8 (fifth liquid chamber) communicates with a liquid tank (T in FIGS. 8 and 9) through passage 1b and a boost check valve (B in FIGS. 8 and 9) for keeping a suction (negative pressure). The spring chamber 8 has a hydraulic pressure which approximates a tank pressure. Furthermore, the bore 6a of the cap 6 communicates with the tank T through the passage 4e, the spring chamber 8 and the boost check valve, and a hydraulic pressure thereof also has a value which approximates the value of a tank pressure. Accordingly, the effective pressure receiving area of the piston 4 is obtained by subtracting a total of the areas of the bottom faces 23 and 24 and the rearward acting face 21 from the area of the forward acting face 31. A total of the areas of the bottom faces 23 and 24 is $(d3^2 \times (\pi/4))$, and the area of the rearward acting face 21 is $((d1^2-d4^2) \times (\pi/4))$. The area of the forward acting face 31 is $((d1^2-d2^2) \times (\pi/4))$. Accordingly, an effective pressure receiving area A1 of the piston is expressed by the following equation (a pressure of the spring chamber 8 approximating 0 is assumed in the following equation).

$$A1=(d4^2-d3^2-d2^2)\times(\pi/4) \qquad \text{(Equation 1)}$$

As is apparent from the above-mentioned Equation 1, the effective pressure receiving area A1 can be set freely by setting the values of d2, d3 and d4.

As is apparent from the above-mentioned equation, furthermore, even if a difference between d3 and d4 is great, the value of A1 can be reduced by an increase in the value of d2. More specifically, the effective pressure receiving area A1 of the piston can be reduced to approximate the effective pressure receiving area of the plunger 3 of $(\pi/4)\times(d5^2-d3^2)$ without reducing the thickness of the first sliding portion 4a. d5 represents a diameter of a portion of the valve seat 2 on which the plunger 3 is placed. Accordingly, it is possible to avoid a situation that the piston 4 completes actuation before the pressure of the inlet 2a reaches the relief pressure, while fully keeping the strength of the piston 4. Consequently, it is also possible to prevent a surge pressure from being generated.

On the other hand, the effective pressure receiving area A1 can be reduced. Therefore, a pressure rise buffer time, that continues after the actuation of the plunger 3 is started until the relief pressure is reached, can also be set long. More specifically, if the effective pressure receiving area A1 is small, the force for actuating the piston 4 is reduced. Consequently, the pressure of the first liquid chamber 22 is slightly raised with the movement of the piston 4. In other words, a pressure difference $\Delta p$ is reduced between front and rear of the restriction 11a. The first liquid chamber 22 has a pressure higher than the pressure of the second liquid chamber 32. An amount Q of liquid exhausted from the first liquid chamber 22 into the sliding bore through the restriction 11a per unit time is expressed by the following equation.

$$Q=(C)\times(A2)\times(\sqrt{\Delta p}) \qquad \text{(Equation 2)}$$

Q: Amount of exhausted liquid
C: Coefficient of exhaust
A2: Restriction sectional area
Δp: Pressure difference between front and rear of restriction As is apparent from the above-mentioned Equation 2, if the pressure difference Δp between front and rear of the restriction 11a is small, the amount Q of exhausted liquid is reduced. In other words, a moving speed of the piston 4 is decreased and the pressure rise buffer time is increased. Consequently, the piston 4 can perform a stroke movement slowly until the pressure of the inlet 2a reaches the relief pressure. Thus, a surge pressure can be prevented from being generated.

Figure 2:
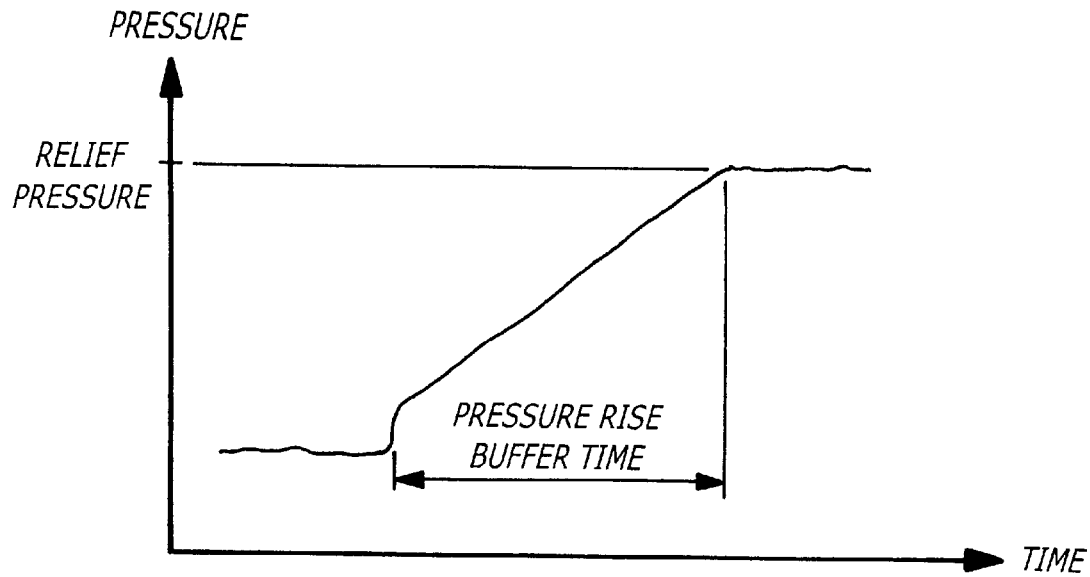
FIG. 2 is a graph showing a temporal change of a pressure in an inlet of the relief valve of FIG. 1.

FIG. 2 illustrates a temporal change of a pressure in the inlet 2a of the relief valve. The chart shows a state in which a surge pressure is not generated because the pressure rise buffer time is set long and the actuation of the piston 4 is not completed before the pressure of the inlet 2a reaches the relief pressure.

As is apparent from Equation 2, if the sectional area A2 of the restriction 11a is increased, the amount Q of exhausted liquid can be increased and the pressure rise buffer time can also be shortened. Thus, in the relief valve R1, the pressure rise buffer time can be set freely.

Figure 3:
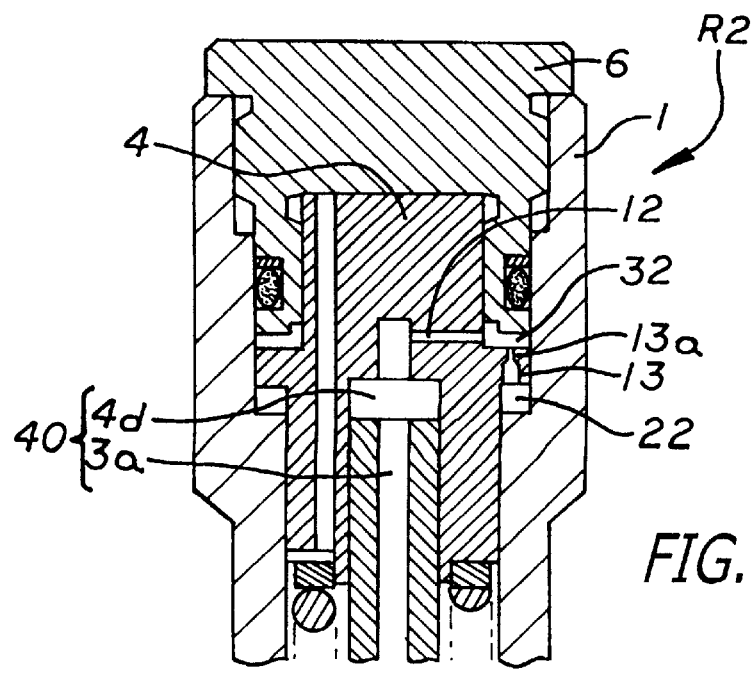
FIG. 3 is a longitudinal sectional view showing the periphery of a piston of a relief valve according to another embodiment of the invention.

FIG. 3 is a longitudinal sectional view showing the periphery of a piston 4 of a relief valve R2 according to another embodiment of the invention. The relief valve R2 is constructed in such a manner that the piston 4 is not provided with a communicating hole for directly coupling a third liquid chamber 40 and a first liquid chamber 22 together but is provided with a communicating hole 13 for causing the first liquid chamber 22 and a second liquid chamber 32 to communicate with each other. On this point, the relief valve R2 is different from the relief valve R1 shown in FIG. 1. In other words, the first liquid chamber 22 indirectly communicates with the third liquid chamber 40 through a communicating hole 12 and the communicating hole 13. A restriction is not formed in the communicating hole 12 but a restriction 13a is formed in the communicating hole 13. The first liquid chamber 22 has a pressure higher than the pressure of the second liquid chamber 32 and serves to regulate a pressure rise buffer time. Other structures are the same as in the relief valve R1 shown in FIG. 1. The action of the relief valve R2 is essentially the same as that of the relief valve R1 shown in FIG. 1.

Figure 4:
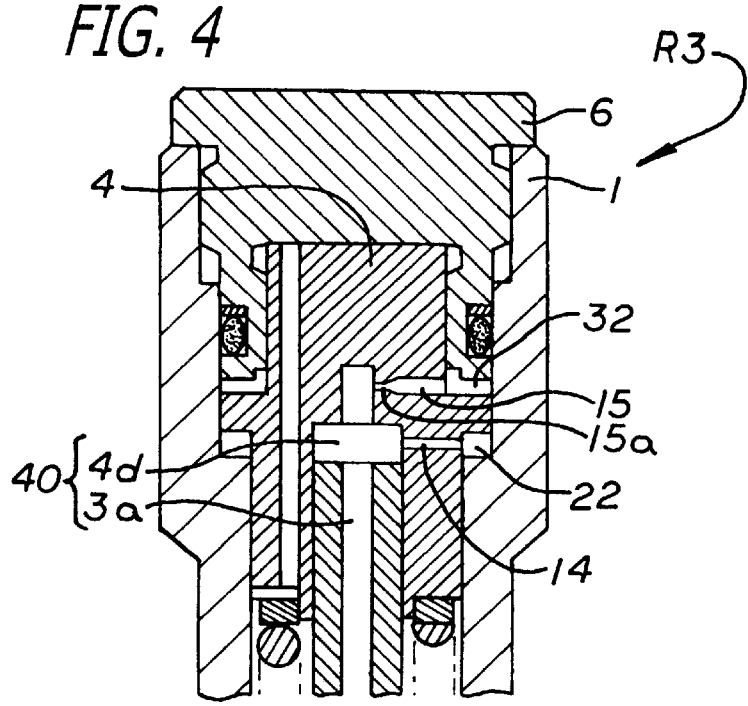
FIG. 4 is a longitudinal sectional view showing the periphery of a piston of a relief valve according to yet another embodiment of the invention.

FIG. 4 shows a piston 4 of a relief valve R3 according to yet another embodiment of the invention. The relief valve R3 is constructed in such a manner that a restriction is not formed in a communicating hole 14 for causing a third liquid chamber 40 and a first liquid chamber 22 to communicate with each other but a restriction 15a is formed in a communicating hole 15 for causing the third liquid chamber 40 and a second liquid chamber 32 to communicate with each other. On this point, the relief valve R3 is different from the relief valve R1 shown in FIG. 1. In the relief valve R3, the first liquid chamber 22 has a pressure higher than the pressures of the second liquid chamber 32 and the third liquid chamber 40 when the piston 4 is moving forward. Other structures are the same as in the relief valve R1 shown in FIG. 1. The pressure of the first liquid chamber 22 is raised with the forward movement of the piston 4. A pressure difference Δp between front and rear of the restriction 15a can be reduced by causing the pressure to be slightly increased. Consequently, a pressure rise buffer time can also be set long in the same manner as in the relief valve R1 shown in FIG. 1. Further, the pressure rise buffer time can be set short by increasing a sectional area A2 of the restriction 15a. The action of the relief valve R3 is also essentially the same as that of the relief valve R1 shown in FIG. 1.

Figure 5:
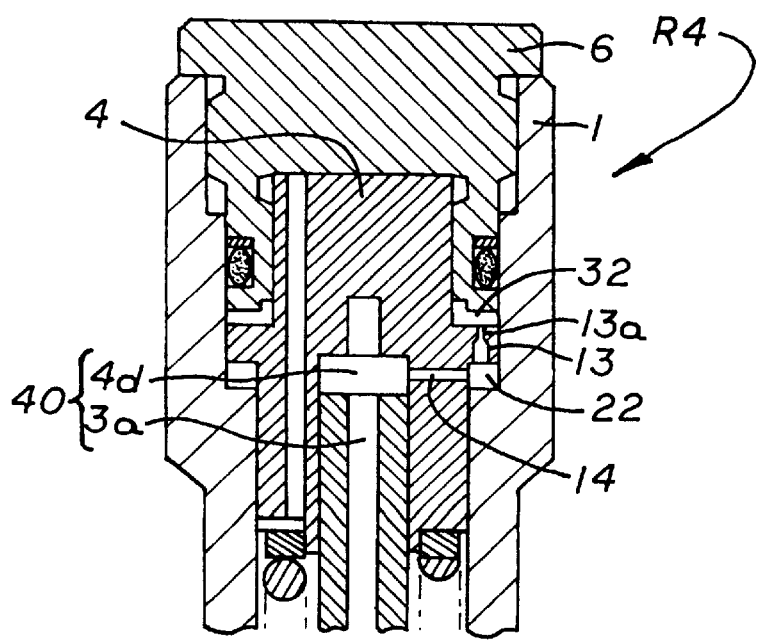
FIG. 5 is a longitudinal sectional view showing the periphery of a piston of a relief valve according to a further embodiment of the invention.

FIG. 5 shows a piston 4 of a relief valve R4 according to a further embodiment of the invention. The relief valve R4 is constructed in such a manner that the piston 4 is not provided with a communicating hole for directly coupling a third liquid chamber 40 and a second liquid chamber 32 together but is provided with a communicating hole 13 for causing a first liquid chamber 22 and the second liquid chamber 32 to communicate with each other. On this point, the relief valve R4 is different from the relief valve R3 shown in FIG. 4. In other words, the second liquid chamber 32 indirectly communicates with the third liquid chamber 40 through a communicating hole 14 and the communicating hole 13. A restriction is not formed in the communicating hole 14 but a restriction 13a is formed in the communicating hole 13. Other structures are the same as in the relief valve R3 shown in FIG. 4. Also in the relief valve R4, the first liquid chamber 22 has a pressure higher than the pressure of the second liquid chamber 32 as the piston 4 moves forwardly, and serves to regulate a pressure rise buffer time. The action of the relief valve R4 is also the same as that of the relief valve R1 shown in FIG. 1.

Figure 6:
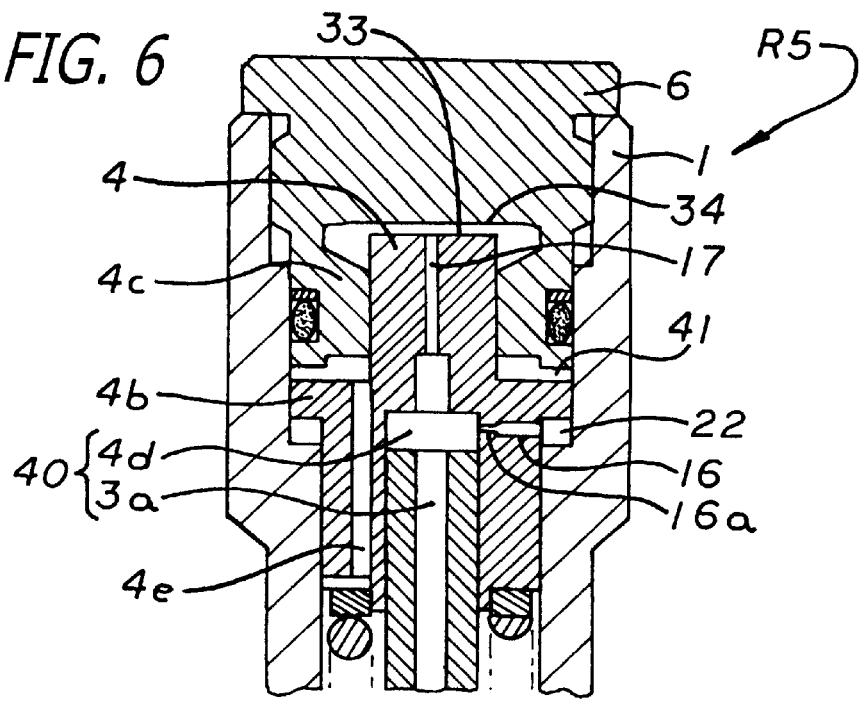
FIG. 6 is a longitudinal sectional view showing the periphery of a piston of a relief valve according to a further embodiment of the invention.

FIG. 6 shows a piston 4 of a relief valve R5 according to a further embodiment of the invention. The relief valve R5 is constructed in such a manner that a rear end face of a second sliding portion 4b acting as a large diameter portion does not function as a forward acting face, but a rear end face 33 of a third sliding portion 4c functions as the forward acting face (33). On this point, the relief valve R5 is different from the relief valve R1 shown in FIG. 1. A bore formed in a cap 6 acts as a second liquid chamber 34 and has a high pressure to function as a liquid chamber for generating a forward acting pressure. The piston 4 is provided with a communicating hole 16 for causing a sliding bore and a first liquid chamber 22 to communicate with each other and a communicating hole 17 for causing the sliding bore and the second liquid chamber 34 to communicate with each other. A restriction 16a is formed in the communicating hole 16. A pressure of the first liquid chamber 22 is higher than that of a liquid chamber 41 on which the rear end face of the second sliding portion 4b fronts, and controls an outflow time of a liquid. The pressure of the liquid chamber 41 is caused to communicate with a tank pressure through a passage 4e formed in the piston 4 by means of a boost check valve (B in FIGS. 8 and 9) or the like for keeping a suction (negative pressure). The action of the relief valve R5 is also essentially the same as that of the relief valve R1 shown in FIG. 1.

Figure 7:
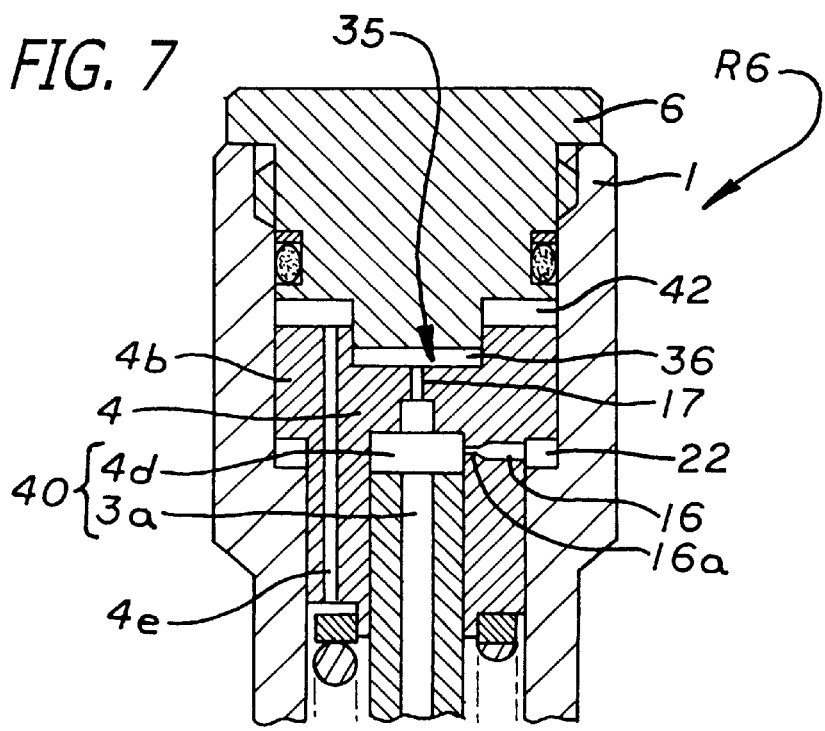
FIG. 7 is a longitudinal sectional view showing the periphery of a piston of a relief valve according to a further embodiment of the invention.

FIG. 7 shows a piston 4 of a relief valve R6 according to a further embodiment of the invention. The relief valve R6 is different from the relief valve R5 shown in FIG. 6 in that a bottom face of a bore opened rearward on the piston 4 functions as a forward acting face 35. The bore acts as a second liquid chamber 36, and has a high pressure to function as a liquid chamber for generating a forward acting pressure. The piston 4 is provided with a communicating hole 16 for causing a third liquid chamber 40 and a first liquid chamber 22 to communicate with each other and a communicating hole 17 for causing the third liquid chamber 40 and the second liquid chamber 36 to communicate with each other. The first liquid chamber 22 functions as a high pressure chamber in which a pressure is higher than in the third liquid chamber 40 as the piston 4 moves forwardly. The action of the relief valve R6 is also essentially the same as that of the relief valve R1 shown in FIG. 1. Numeral 4e denotes a passage for causing a hydraulic pressure of a liquid chamber 42 to communicate with a tank pressure through a boost check valve (B in FIGS. 8 and 9). A pressure of a spring chamber 8 (fifth liquid chamber) has a value which approximates the value of the tank pressure.

Figure 8:
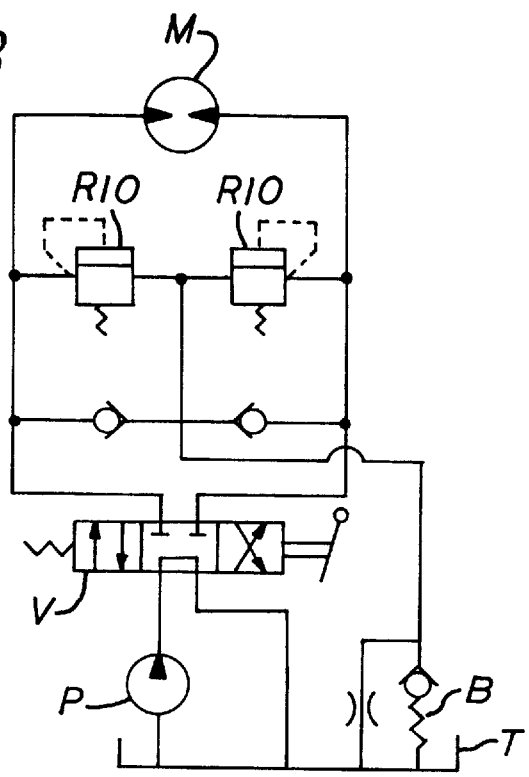
FIG. 8 is a diagram showing an example of a hydraulic circuit using a relief valve.
Figure 9:
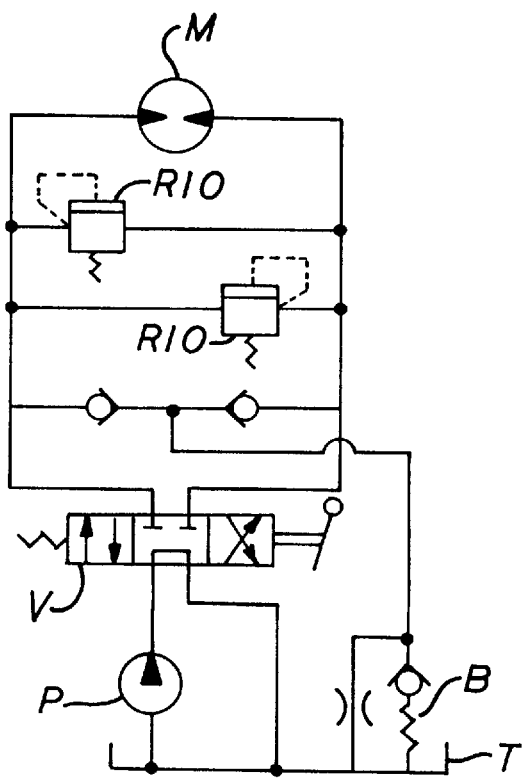
FIG. 9 is a diagram showing another example of a hydraulic circuit using the relief valve.
Figure 10:
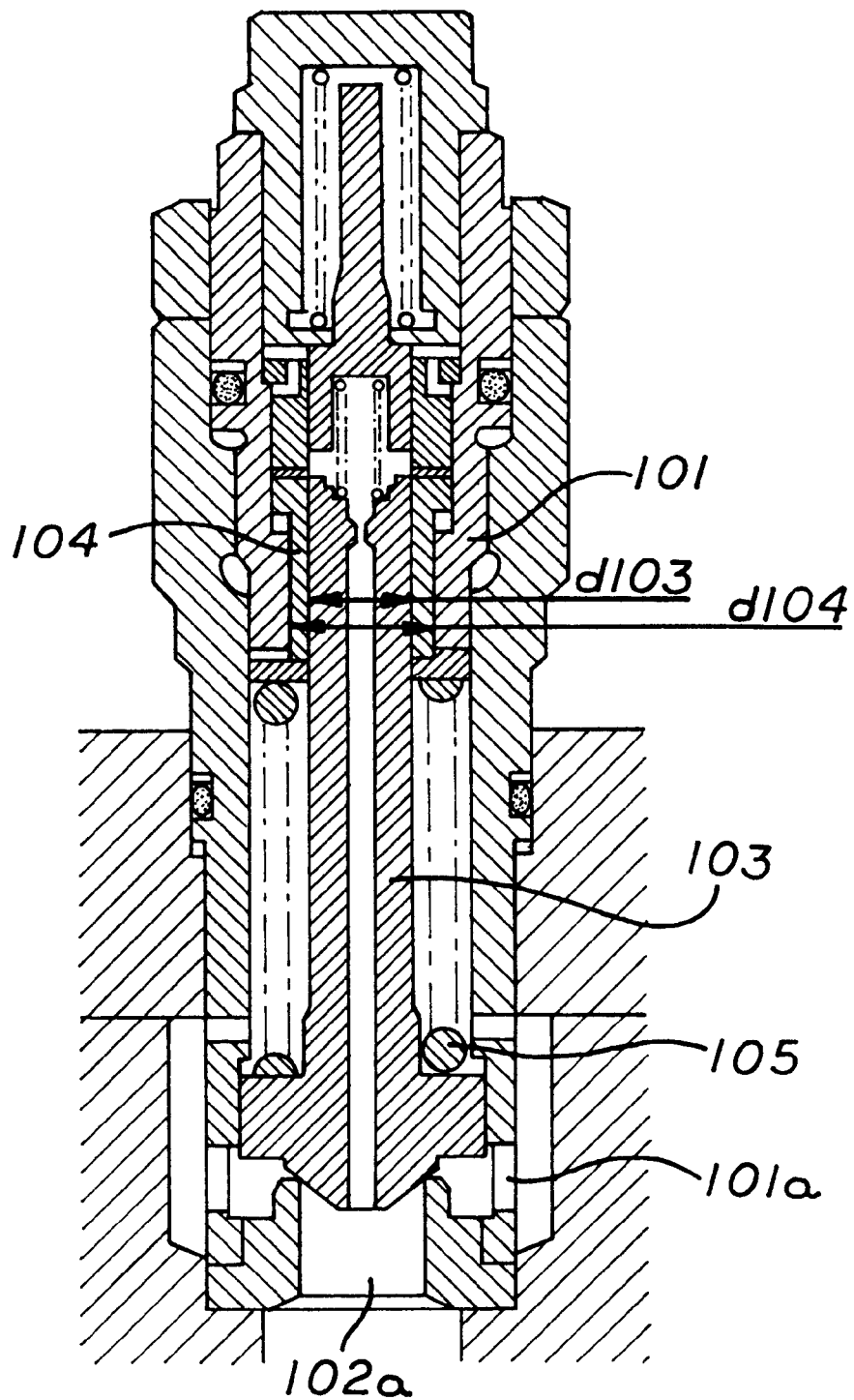
FIG. 10 is a sectional view showing a relief valve according to the prior art.
Figure 11A:
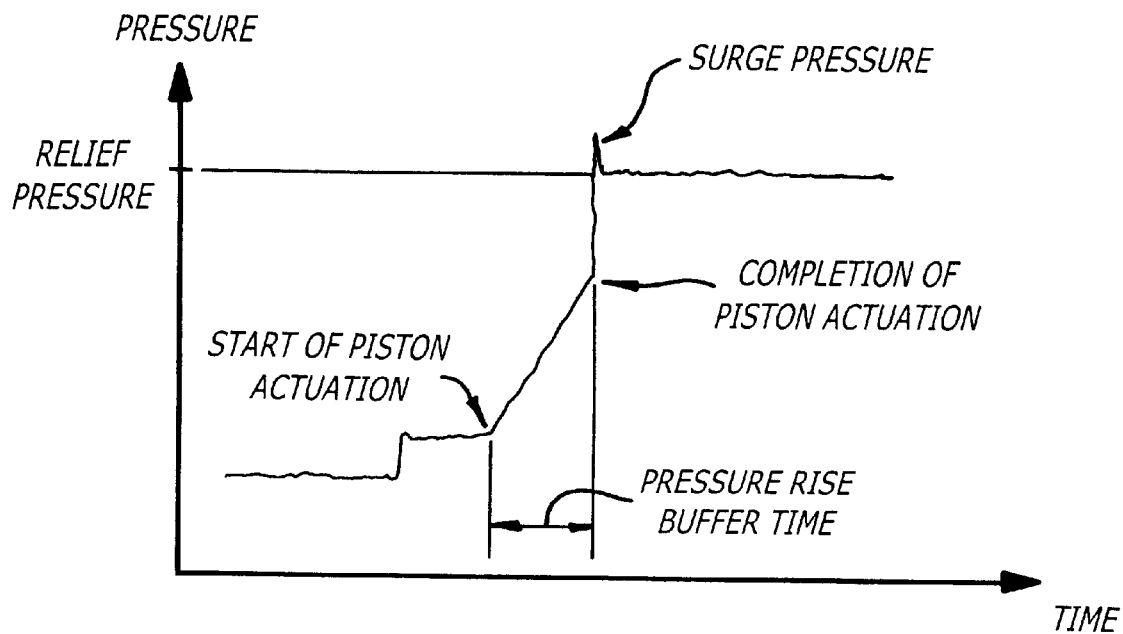
FIGS. 11A and 11B are graphs showing a temporal change of a pressure of an inlet in the relief valve according to the prior art.
Figure 11B:
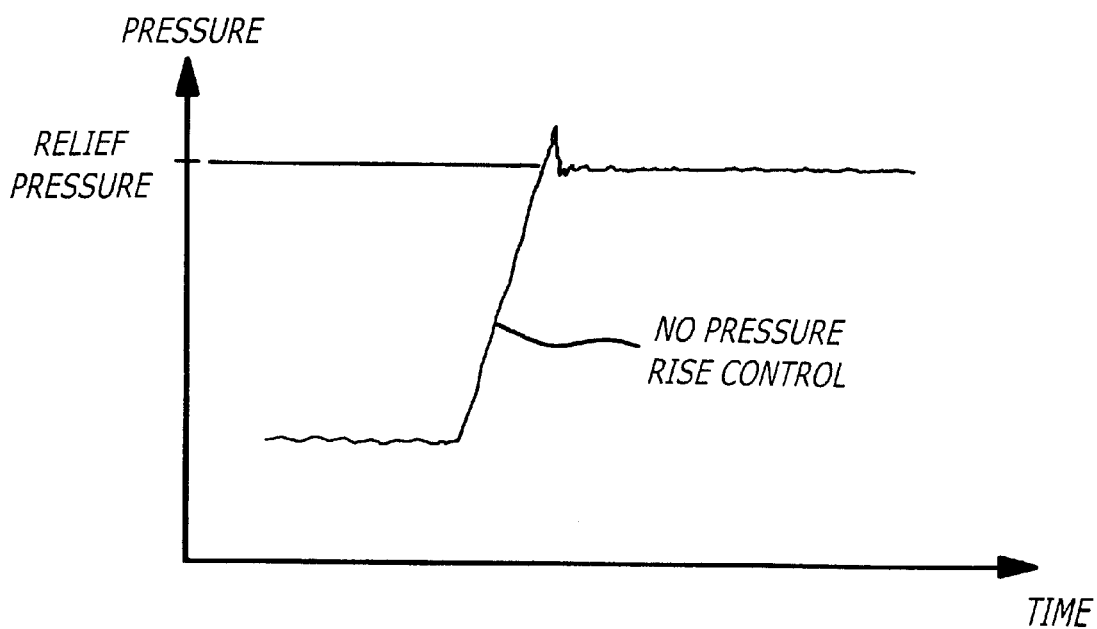

While the relief valves R1 to R6 have been described above, they can be applied to a circuit configuration shown in FIG. 9 as well as a circuit shown in FIG. 8, and the same effects can be obtained. In the circuit shown in FIG. 9, an outflow port in the relief actuation does not communicate with a tank T. However, since a low-pressure state in the circuit is set to the same pressure level as the tank, the actuation is carried out by the same acting principle.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention.

We claim:

1. A relief valve, comprising:
   a case having a forward end and a rearward end, and an inner bore, and an opening defining an outlet;
   a valve seat adjacent to forward end of the case, the valve seat defining an inlet;
   a spring, disposed within the case;
   a first liquid chamber;
   a second liquid chamber;
   a third liquid chamber;
   a plunger slidably disposed within the case and pressed forward by the spring to shut off fluid communication between the inlet and the outlet, and which moves rearwardly against elastic force of the spring with an increase in fluid pressure at the inlet, thereby making the inlet and outlet communicate with each other;
   a piston slidably disposed within the case, and slidably receiving the plunger, the piston being configured for pushing forward a rear end of the spring, which piston moves forward with the increase in the pressure at the inlet to compress the spring, thereby regulating a relief pressure;
   a liquid chamber defined by the case accommodating the spring therein, and which fluidly communicates with the outlet;
   wherein the piston further comprises a first sliding portion configured for sliding with liquidtightness in the inner bore of case, and a sliding bore formed along a central axis of the piston, and wherein a rear portion of the plunger is slidably inserted and fitted in the sliding bore formed along a central axis of the piston, and the plunger further comprises a through hole configured for feeding a pressurized liquid from the inlet to the rear of the plunger, and
   wherein the third liquid chamber is defined by a space of a rear portion of the sliding bore that the plunger does not reach and the through hole,
   and wherein the piston further comprises a rearward acting face and a forward acting face provided rearward from the first sliding portion of the piston,
   and wherein the third liquid chamber and the first liquid chamber on which the rearward acting face fronts communicate with each other through a communicating hole formed in the piston, and the third liquid chamber and the second liquid chamber on which the forward acting face fronts communicate with each other through a communicating hole formed in the piston, and
   the piston moves forward by a difference between the combined rearward acting force given to a bottom face of the sliding bore and the rearward acting face by the pressurized liquid, and the forward acting force given to the forward acting face by the pressurized liquid.

2. The relief valve according to claim 1, wherein an area of the forward acting face is greater than a total area of the bottom face of the sliding bore and the rearward acting face, and
   the difference between the rearward acting force and the forward acting force is generated by a difference between the area of the forward acting face and said total area.

3. The relief valve according to claim 1, wherein the valve further comprises a cap closing the case at a rearward end, and wherein the piston further comprises a second sliding portion having a diameter larger than a diameter of the first sliding portion and a third sliding portion having a diameter smaller than the diameter of the first sliding portion, the second and third sliding portions being positioned rearward of the first sliding portion of the piston, and wherein the second sliding portion slides with liquidtightness in the inner bore of the case, the third sliding portion slides with liquidtightness in an inner bore formed in the cap, and wherein
   the rearward acting force is provided on a front end face of the second sliding portion and the forward acting face is provided on a rear end face of the second sliding portion and wherein the cap further comprises
      a forth liquid chamber on which the rear end face of the third sliding portion fronts, and which fluidly communicates with the outlet.

4. The relief valve according to claim 1, further comprising a cap fixed to the case at the rearward end, and wherein the piston further comprises:
   a second sliding portion having a diameter larger than a diameter of the first sliding portion; and
   a third sliding portion having a diameter smaller than the diameter of the first sliding portion; each of which is positioned rearward of the first sliding portion of the piston, and wherein the second sliding portion slides with liquid with liquidtightness in the inner bore of the case, and the third sliding portion slides with liquidtightness in an inner bore formed in the cap fixed to the case, and wherein the rear acting face is provided on a front end face of the second sliding portion, and the forward acting face is provided on a rear end face of the third sliding portion, and the cap and piston define a fourth liquid chamber on which the rear end face of the second sliding portion fronts and which fluidly communicates with the outlet.

5. The relief valve according to claim 1, wherein the third liquid chamber and the first liquid chamber communicate with each other through a communicating hole having a restriction, and
   the third liquid chamber and the second liquid chamber communicate with each other through a communicating hole without a restriction.

6. The relief valve according to claim 1, wherein the third liquid chamber and the second liquid chamber communicate with each other through a communicating hole without a restriction, and the first liquid chamber and the second liquid chamber communicate with each other through a communicating hole having a restriction, and the third liquid chamber and the first liquid chamber communicate with each other through the second liquid chamber.

7. The relief valve according to claim 1, wherein the third liquid chamber and the second liquid chamber communicate with each other through a communicating hole having a restriction, and the third liquid chamber and the first liquid chamber communicate with each other through a communicating hole without a restriction.

8. The relief valve according to claim 1, wherein the first liquid chamber and the second liquid chamber communicate with each other through a communicating hole having a restriction, and the third liquid chamber and the first liquid chamber communicate with each other through a communicating hole without a restriction, and the third liquid chamber and the second liquid chamber communicate with each other through the first liquid chamber.

9. The relief valve according to claim 5, wherein a pressure difference is generated across the restriction by a difference between the rearward acting force and the forward acting force, and the piston moves forward while the pressurized liquid passes through the restriction.

10. A relief valve comprising a plunger which is pressed forward by a spring to close the passage between an inlet and an outlet, and in which the plunger moves rearwardly against the elastic force of the spring in response to an increase in the pressure of the inlet, thereby allowing the inlet and the outlet communicate with each other;

the relief valve further comprising a piston which pushes forward in response to an increase in the pressure of the inlet, and in which the piston, in pressing forward, compresses the elastic spring, which in turn presses the plunger forward, thereby regulating relief pressure, wherein:

a liquid chamber accommodating the spring therein communicates with the outlet;

the piston has a first sliding portion which slides with liquidtightness in an inner bore of a case;

a rear portion of the plunger slides into and fits in a sliding bore formed along a central axis of the piston;

the plunger has a through hole for feeding a pressurized liquid from the inlet to the back of the plunger;

a third liquid chamber is created by a space in the a rear portion of the sliding bore and the through hole in the plunger, into which the plunger cannot reach;

a rearward acting face and a forward acting face are provided on a second sliding portion of the piston, the third liquid chamber and a first liquid chamber on which the rearward acting face fronts communicate with each other through a communicating hole formed in the piston, the third liquid chamber and a second liquid chamber on which the forward acting face fronts communicate with each other through a communicating hole formed in the piston, and the piston moves forward by a difference between: 1) the rearward acting forces given to the combination of the bottom face of the sliding bore and the rearward acting face by the pressurized liquid; and 2) the forward acting force given to the forward acting face by the pressurized liquid.

11. The relief valve according to claim 10, wherein an area of the forward acting face is greater than an total area of the bottom face of the sliding bore and an area of the rearward acting face, and the difference between the rearward acting force and the forward acting force is generated by a difference between the area of the forward acting face and the total area.

12. The relief valve according to claim 10, wherein a second sliding portion having a diameter larger than a diameter of the first sliding portion and a third sliding portion having a diameter smaller than the diameter of the first sliding portion are provided to be positioned rearward of the first sliding portion of the piston, and wherein the second sliding portion slides with liquidtightness in the inner bore of the case, and the third sliding portion slides with liquidtightness into an inner bore formed on a cap fixed to the case, and wherein the rearward acting face is created by a foremost face of the second sliding portion and the forward acting face is provided on a rearmost face of the second sliding portion, and a liquid chamber on which a rearmost face of the third sliding portion fronts communicates with the outlet.

13. The relief valve according to claim 10, further comprising a cap fixed to the case, and wherein a second sliding portion has a diameter larger than a diameter of the first sliding portion and a third sliding portion has a diameter smaller than the diameter of the first sliding portion and where the second an third sliding portions are positioned to the rear of the first sliding portion on the piston respectively, and wherein the second sliding portion slides with liquidtightness into the inner bore of the case, and the third sliding portion slides with liquidtightness into an inner bore formed on the cap fixed to the case, and the rearward acting face is created by the foremost face of the second sliding portion and the forward acting face is provided on a rearmost face of the third sliding portion, and the liquid chamber on which the rearmost face of the second sliding portion fronts communicates with the outlet.

14. The relief valve according to claim 10, wherein the third liquid chamber and the first liquid chamber communicate with each other through a communicating hole having a restriction, and the third liquid chamber and the second liquid chamber communicate with each other through a communicating hole having no restriction.

15. The relief valve according to claim 10, wherein the third liquid chamber and the second liquid chamber communicate with each other through a communicating hole having no restriction, the first liquid chamber and the second liquid chamber communicate with each other through a communicating hole having a restriction, and the third liquid chamber and the first liquid chamber communicate with each other through the second liquid chamber.

16. The relief valve according to claim 10, wherein the third liquid chamber and the second liquid chamber communicate with each other through a communicating hole having a restriction, and the third liquid chamber and the first liquid chamber communicate with each other through a communicating hole having no restriction.

17. The relief valve according to claim 10, wherein the third liquid chamber and the first liquid chamber communicate with each other through a communicating hole having no restriction, the first liquid chamber and the second liquid chamber communicate with each other through a communicating hole having a restriction, and the third liquid chamber and the second liquid chamber communicate with each other through the first liquid chamber.

18. The relief valve according to claim 15, wherein a pressure difference is generated between front and rear of the restriction by a difference between the rearward acting force and the forward acting force, and the piston moves forward while the pressurized liquid passes through the restriction.

\* \* \* \* \*